Nov. 28, 1961 R. POST 3,010,657
TEMPERATURE CONTROL APPARATUS FOR MOLTEN MATERIAL
Filed Feb. 11, 1959
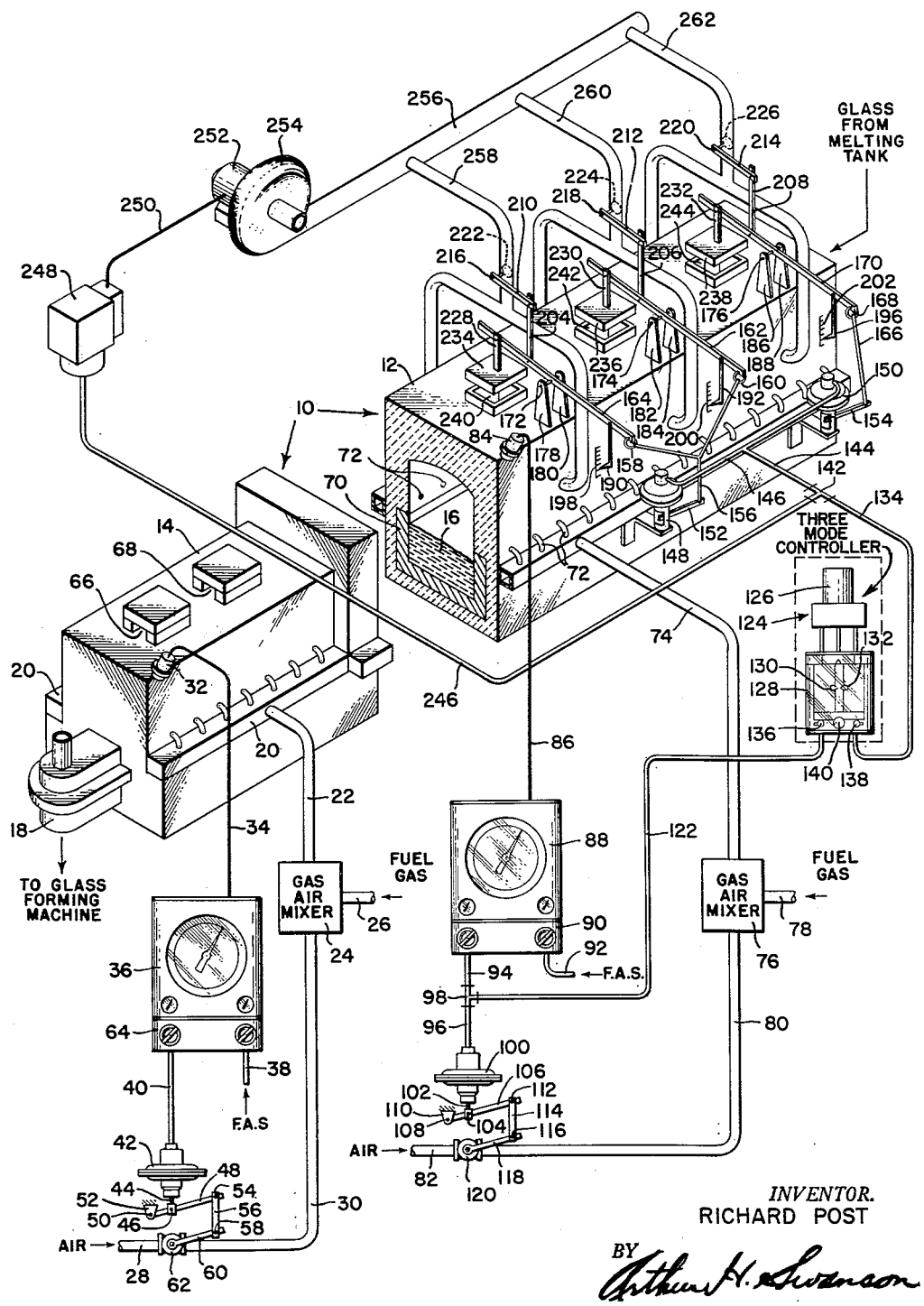
INVENTOR.
RICHARD POST
BY
Arthur H. Swenson
ATTORNEY.

United States Patent Office 3,010,657
Patented Nov. 28, 1961

3,010,657
TEMPERATURE CONTROL APPARATUS
FOR MOLTEN MATERIAL
Richard Post, Philadelphia, Pa., assignor to Minneapolis-Honeywell Regulator Company, Minneapolis, Minn., a corporation of Delaware
Filed Feb. 11, 1959, Ser. No. 792,617
5 Claims. (Cl. 236—15)

It is one of the objects of the present invention to provide an apparatus to maintain the temperature of molten material flowing through a forehearth at some desired predetermined temperature.

The general object of the present invention is to provide an automatically operated control apparatus to control the amount of fuel that will be permitted to flow to a cooling section of a forehearth while it simultaneously controls the amount of cooling wind that is being blown into and out of this cooling section.

The control apparatus of the present invention is especially useful in the glass container manufacturing field. In the manufacture of these containers glass in a molten state flows from a melting tank into one end of the aforementioned cooling section. As this molten glass passes through this cooling section, it is heated and/or cooled so that it will have reached a prescribed temperature as it flows out of the other end of the cooling section through a conditioning section and out of a spout in this latter mentioned section as a gob to a glass ware forming machine, e.g. a glass container forming machine.

One of the problems which glass manufacturers have heretofore encountered is that they have been unable to satisfactorily control the rate at which molten glass is cooled to a predetermined desired temperature over a wide range of production rate as it passes through a cooling section of a forehearth so that uniform glass ware of prescribed thicknesses and weight may be continuously produced from a gob of this molten glass. In this regard it should be noted that when glass gobs are cut from a continuous flow of the aforementioned improperly cooled molten glass and they are introduced into a container forming machine, then a container that is either under or over a desired prescribed weight is formed. If the temperature of the gob is below the prescribed temperature a container with a very thin, readily breakable wall characteristic is produced. If on the other hand the gob temperature is above the prescribed temperature then a container having an abnormally thick wall will be produced which will not only be unnecessarily expensive but also cause a container to be made which will not be able to retain the amount of fluid material that it is designed to hold.

Proper control of the rate of cooling of molten glass is thus important to glass manufacturers as it assists the forehearth operator in obtaining a more uniform, repeatable, viscous flow of this molten glass as it passes through the spout in a conditioning section of the forehearth where it is formed into a gob before it is transported to a glass ware container forming machine. With proper control of the rate of cooling, the total weight of each piece of glass ware produced by the forming machine can thus be made equal to every other piece of glass ware produced in this manner.

It can thus be seen that if a control apparatus such as is disclosed in this specification is used to maintain uniformity in the temperature and weight of each glass gob, the aforementioned non-uniform abnormally thin and thick glass container wall problem can be greatly improved.

To this end it is therefore another more specific object of the present invention to employ a controller whose output signal is varied in accordance with the temperature of molten glass that is flowing through a cooling section of a glass forehearth and whose output signal is used to automatically adjust the correct amount of cooling wind that is blown into and out of such a cooling forehearth so as to maintain the temperature of the molten glass at a predetermined temperature.

Still another object of the invention is to provide a controller of the aforementioned type which will enable more uniform heating of the molten glass being fed through a forehearth so that the temperature of this molten glass will be at some prescribed temperature when it passes out of the aforementioned conditioning section spout to a container forming machine.

Another object of the present invention is to provide a temperature responsive cooling wind control apparatus of the aforementioned type which will more rapidly and hence more economically bring the temperature of the cooling section of a forehearth to a desired predetermined temperature and hold it at that temperature for a longer period of time than can be accomplished with manually operated cooling control systems that have heretofore been employed for such cooling wind control operations.

Another object of the present invention is to employ a temperature responsive cooling wind control system of the aforementioned automatically operated time saving variety which will thus permit a greater amount of molten glass of uniform consistency to be manufactured than has heretofore been possible when manually controlled systems have been employed for this cooling wind control operation.

In the drawing there is shown a glass forehearth 10 which is of a well known commercially available type. This forehearth 10 is comprised of a cooling section 12 and a conditioning section 14 through which sections a molten glass 16 flows as a gob in the direction of the arrow from a melting tank, not shown, through a spout 18 in the direction of the arrow to a container forming machine, not shown.

The aforementioned forehearth conditioning section is provided with burners 20. A conduit 22 is shown connecting the burners 20 with a mixer 24 into which a fuel gas from a source, not shown, flows by way of conduit 26. An air supply from an air pressure source, not shown, is also supplied by way of a supply conduit 28, 30 to this mixer 24.

This conditioning zone is also shown having contained in its upper wall a radiation pyrometer 32 which may be of a well known commercial type such as is shown in the Harrison Patent 2,357,193 filed August 29, 1944. This pyrometer is so located that it will sight the temperature of the molten glass 16 prior to the time the glass exits from the spout 18. A suitable electrical conductor 34 is shown connecting the pyrometer 32 to an input end of a condition zone temperature indicating controller 36 which may be of the self balancing potentiometer type such as is disclosed in the W. P. Wills Patent 2,423,540 filed December 1, 1941. The indicating controller 36 has a filtered air supply F.A.S. flowing from a source, not shown, through the conduit 38. The controller 36 also has an outlet conduit 40 through which a controlled fluid pressure signal is transmitted to a diaphragm actuated air motor 42.

The diaphragm which is within this air motor is used to convert an output fluid pressure signal being transmitted by the way of conduit 40, which is proportional to the temperature being sensed by the pyrometer 32, into vertical motion of an actuator rod 44. The lower end of this actuator rod 44 is connected for movement by means of a pin connection 46 so as to enable it to move a lever 48. The left end of the lever 48 is pivoted by a pivot pin 50 that is connected to a stationary member 52. The lever 48 is connected by a pin 54 to a second link 56 which in turn is connected by pin 54 to an actuating lever 60 of a combustion air valve 62 to regulate the flow of air through conduit 28, 30 in accordance with changes occurring in the temperature of the molten glass which is being sensed by the pyrometer 32.

The aforementioned arrangement is such that should the temperature of the molten glass in the conditioning zone 14 of the forehearth exceed a prescribed pouring temperature the output fluid pressure signal of the controller 36 acting on the air motor will be changed in such a manner that the air motor actuated rod 44 and links 48, 56, 60 will be caused to move to close the valve 62 to reduce the mass flow rate at which air is permitted to flow into the forehearth. This change in air flow rate will bring the temperature of the conditioning zone of a forehearth back to its prescribed pouring temperature condition. The arrangement is such that as a reduction in the flow of air passing through the mixing chamber 24 occurs the mixing chamber arrangement is such that less gas will be sucked into the mixing chamber 24 and into the flow of air being transmitted through the conduit 22 to the conditioning zone burners 20. In a similar but opposite manner it can be seen that if the temperature of the molten glass as sensed by the pyrometer 32 is decreased below some preselected value, the output fluid pressure of the controller 30 will be such as to cause the valve 62 to be moved toward its open position and thus permit a greater mass flow rate of air-gas flow to pass to the burners 20. The controller 36 may also have included therein, if it is so desired, an automatic manual switching control panel 64 as shown which may be of the type which is disclosed in the D. P. Eckman Patent 2,639,-887 filed January 23, 1943, and/or the J. G. Booth Patent 2,588,799 filed October 14, 1947.

In the top of the conditioning zone of the forehearth there is shown two exhaust openings 66, 68 through which gases within this zone may be exhausted to the atmosphere.

It should be understood that the novel control ideas presented in this application do not cover the aforementioned conditioning zone temperature control apparatus. This latter mentioned control apparatus has merely been presented so as to show its usefulness in maintaining the spout temperature of the molten glass at a predetermined level and to also present a clearer understanding of the overall control operation of conditioning zone end of the forehearth.

Referring now to the control apparatus for controlling the cooling wind of the cooling section 12 to which this application is directed it can be seen that this section 12 is comprised of a channel 70 through which a preselected level of molten glass 16 is flowing in the direction of the arrow from a melting tank, not shown, into the right end of the aforementioned described conditioning zone.

This cooling section has a plurality of burners 72 on opposite sides of the forehearth cooling section 12. A conduit 74 connects the burners with a gas-air mixer 76 and this mixer in turn is connected to the indicated fuel gas supply source which is flowing in the direction of the arrow by way of conduit 78 to the mixer 76. An air pressure supply conduit 80, 82 is connected to this mixer at one of its ends and at its other end to an air pressure supply source, not shown.

An upper wall portion which forms a part of the cooling zone 12 of the forehearth 10 has a radiation pyrometer 84 positioned therein so it can sense the temperature of the molten glass as it flows through the left end of this cooling zone 12 before it passes into the conditioning zone 14. A suitable electrical conductor 86 connects this pyrometer 84 with the input end of a cooling zone temperature indicating controller 88 which may be of the type which is disclosed in the Wills Patent 2,423,540, filed December 1, 1941. This indicating controller has included therein an automatic to manual switching control panel 90 of the type such as is disclosed in the D. P. Eckman Patent filed January 23, 1943, and/or the J. G. Booth Patent 2,588,799 filed October 14, 1947.

Controller 88 also has a filtered air supply F.A.S. flowing from a source, not shown, through the conduit 92 in the direction of the arrow.

Outlet conduit 94, 96 and a T 98 therebetween provides a means through which an output control pressure signal from the controller 88 can be transmitted and applied to a diaphragm actuated air motor 100. Connected to the output end of this air motor 100 there is an actuator rod 102. A pin 104 is shown connecting this rod 102 with pivoted link 106 which in turn is shown pivoted at its left end by way of a pivot pin 108 to a stationary lug 110. The other end of the link 106 is connected by the pivot pin 112 to link 114 which in turn is connected by another pin 116 to one end of an actuating lever 118 of a combustion air valve 120.

Such a control arrangement as that described supra will provide a means for regulating the flow of the supply air under pressure that is being transmitted through the conduits 82, 80, mixer 76, conduit 74 to the burners 72 in accordance with changes in the temperature of the molten glass which is being sensed by the pyrometer 84. The arrangement is such that should the temperature of the molten glass in the channel 70 of the cooling zone 12 exceed a prescribed temperature it should be at just before it enters the right end of the conditioning zone, the output fluid pressure signal that will be applied to the diaphragm air operated motor 100 through conduits 94, 96 and the T 98 will be changed in such a manner that the air motor actuator rod 102 and links 106, 114, 118 actuated thereby will cause the valve 120 to be moved toward a closed position. This action will cause a reduction in the mass rate of flow of air-fuel gas mixture to be transmitted by way of the gas mixer 76 and conduit 74 to the burners 72. This action will only partially assist in reducing the heat that the lighted burners 72 introduced into the portion of this cooling zone of the forehearth which are shown located just above the upper portion of the channel 78. The control arrangement is such that a small minimum amount of air-fuel gas will always be transmitted to the burners to keep them lit even through the temperature sensed by the pyrometer 84 goes above a predetermined desired upper value.

It can further be seen from the drawing that the improved control apparatus which applicant desires to disclose in this application not only makes use of the T 98 in conduits 94, 98 to transmit the output pressure signal from the controller 88 to the air valve to control the amount of air-fuel gas mixture that is being transmitted to the burners in the forehearth cooling zone but it also utilizes the remaining opening in the T to send this same output pressure signal through the conduit 122 to a second indicating controller 124. This second indicating controller 124 contains a pneumatic controller 126 having a plurality of stacked chambers that have inflexible side walls and a plurality of stacked diaphragms forming the upper and lower walls of these chambers. This indicating controller is further comprised of an indicator 128 on which there is shown a pointer 130 for indicating the magnitude of the process variable pressure signal or in other words the pressure signal being applied by way of the input conduit 122 to the controller 126.

This indicator 128 is also shown as having a second indicating pointer 132 for indicating the magnitude of the output pressure that is being transmitted by way of a pressure regulator, which is built into this controller, to the conduit 134. The front face of this indicating controller 124 is shown as having a rotatable set point adjusting lever 136, a rotatable switch 138 for switching between manual and automatic control operations and a rotatable knob 140 for adjusting the output air pressure of the aforementioned regulator when the controller is in a manually operating position so the output air pressure of the controller can be adjusted by rotation of this knob 140. This indicating controller 124 is of the same general type of the three mode type of indicating controller that is disclosed in the George R. Brown patent application No. 511,489 filed May 26, 1955, now U.S. Patent No. 2,911,990, and which is provided with manual means for adjusting the proportional band, rate and reset settings of this controller in a manner described in detail for example in the Harrison Patent 2,915,079 patented December 1, 1959.

The controller 126 is responsive to an air input pressure signal that is being applied thereto from the first mentioned indicating controller 88 by way of conduits 94, T 98 and conduit 122. This applied pressure is referred to in the controller art as a "Measured Variable" pressure and when applied to the controller in this fashion will produce an output pressure in the conduit 134 that is proportional to the magnitude of this measured variable pressure and the magnitude of a set point fluid pressure whose magnitude is selected by rotation of the regulation knob 136 when the switch 138 is in an automatic control position.

Even though the indicating controller 124 is of the same general type as the controller shown in the aforementioned Brown and Harrison patents it should be noted that a manual adjustment of the set point pressure can be made which will provide optimum fuel head pressure. Because of the abnormally wide two hundred to five hundred per cent of full scale change proportional band and the inherent slow reset control action which may be two to five times slower than the fuel controller 88 in the aforementioned Brown controller 124 very satisfactory smooth control action is possible which has not heretofore been possible when manually operated controls have been used for this purpose. A suitable controller knob needle valve reset rate setting of three repeats per minute will provide the aforementioned slow reset control action. This reset rate control setting together with a controller knob needle valve rate time setting of one quarter of a minute along with the aforementioned controller knob needle valve proportional band setting will provide the very satisfactory smooth control action referred to supra.

As have been previously noted it is one of the objects of the present invention to make use of the air pressure changes taking place in the output end of such a controller 126 to control the cooling wind passing into the cooling section 12 of the forehearth. To this end the controller output pressure signal is applied by way of one branch of a conduit 134, the T 142, conduit 144 and by way of the respective ends of conduit 146 to air motors 148, 150. While not shown in detail the air motor 148 is connected for movement in an up and down direction to the left end of an actuator arm 152 in a manner similar to that previously set forth for the actuator arm 106. The air motor 150 is also connected to its actuator arm 154 in a manner similar to that just described for the motor 148.

The right end of the actuator arm 152 is in turn pivotly connected to a Y-shaped linkage 156 which may be made of a wire rope. The upper left and right ends of the linkage 156 is shown connected by way of suitable ring shaped shackles 158, 160 respectively to the right ends of the beams 162, 164.

The right end of the actuator arm 154 is likewise pivotly connected to a link 156 which may be made of wire rope and which is connected by way of a ring shaped shackle 168 to the right end of the beam 170.

Each of the beams 162, 164, and 170 are pivoted in a see-saw fashion on pins 172, 174, 176 which pins are in turn pivotly mounted as shown in the top of their respective support members 178, 180, 182, 184, 186 and 188.

Indicating pointers 190, 192, 196 are respectively shown pivotly attached at their upper end to their associated beams 164, 162, 170 and having their lower ends aligned with their associated damper positioning indicating scales 198, 200, 202.

A portion which is just to the left of the center of each of the beams is shown pivotly connected to their respective links 204, 206, 208. The upper ends of each of these links are in turn pivotly mounted to their associated crank arms 210, 212, 214. The right ends of each crank arm 210, 212, 214 has protruding therefrom their respective butterfly valve shaft 216, 218, or 220, to the other end of each of which there is fixedly attached a butterfly valve 222, 224, 226.

Adjacent and pivotly mounted on the left end of each of the respective beams 164, 162, 170 and projecting therefrom there is shown the respective links 228, 230, and 232. The lower end of the links 228, 230, 232 are fixedly connected to the top of their respective damper bricks 234, 236, 238 which are immediately above and covering atmospheric exhaust vents 240, 242, 244 which are cut into the top wall of the cooling section.

It has also been previously pointed out in the early part of the specification that it is another object of this invention to make use of the output air pressure changes taking place in the outlet conduit 134 of the controller 126 to control the cooling wind passing into the cooling section 12 of the forehearth 10. To this end the controller output pressure signal is applied by way of conduits 134, T 142, conduit 246 to a low pressure actuator switch 248 which is set to snap two electrical switch parts into a close contacting position with one another whenever the air pressure in the conduit 246 being applied to this switch is raised to a preselected upper pressure level condition. In a similar but opposite manner the pressure actuator switch 248 is also preset to break these two electrical switch parts out of contact with one another whenever the air pressure in the conduit 246 is lowered to a preselected low pressure level condition. Switches of this type are manufactured and sold by Minneapolis-Honeywell Regulator Company under the trademark name of Pressuretrol.

Suitable electrical conductors are retained within the cable covering 250 for connecting the aforementioned contacting low pressure actuator electrical switch 248 with an electrical blower motor 252. The arrangement is such that upon the closing of the contacts of this switch 248, the blower motor 252 will be energized and a fan, not shown, which is attached to the end of the shaft of this motor will be rotated and air will then be blown by this fan through the casing 254, the ducts 256, 258, 260, 262 past the butterfly valves 222, 224, 226 into opposite sides of the wall of the cooling section 12.

This blown air then flows through manifolding which is formed in the wall of the cooling section, not shown, into the interior of this section to provide a cooling effect on the molten glass that is flowing through the channel 70.

The operation of controlling the cooling wind which is entering and leaving the cooling section 12 of the forehearth 10 with the heretofore described control system will now be explained in detail.

In a condition in which a temperature of the cooling section, as sensed by the pyrometer 84, exceeds a prescribed upper temperature level and it then becomes necessary to automatically cause cooling wind to be introduced into the cooling section, the indicating controller 88 will transmit through conduit 94, T 98, conduit 122 a proportional increase change in the magnitude of the pressure signal to increase the measured variable signal that is then acting on the controller 126. When the measured variable pressure signal of the controller 126 is changed in this manner the controller will exert a self-correcting action in the output pressure signal within conduit 134 which, in time will cause this abnormally high measured variable signal to be brought back to the level of the preset set point pressure that is in the set point chamber of the controller.

As this raising of the output pressure signal of the controller which is acting on the pressure switch through conduits 134, 246 occurs a preselected pressure will be reached at which time the switch 248 will cause the start switch of electrical motor 252 to be closed and thus cause the blower fan attached thereto to be rotated. This action will in turn cause a flow of air to be blown into the duct 256, 258, 262 past the then still partially closed butterfly valves 222, 224, and 226 into the side walls of the cooling section.

An instant of time after the blower has been energized to blow cooling air into the cooling section the butterfly valves 222, 224, 226 will be moved by their associated motor valve links attached thereto to an open position. It can thus be seen that a very efficient control system has been provided which will effectively and efficiently cause cooling air to be blown into a cooling section and the hot air contained therein to be forced by this cooling air out through the space between the vents 240, 242, 244 and their associated brick dampers 230, 232, 234 which dampers are simultaneously opened as the cooling air is initially introduced.

In a similar but opposite manner it can be seen that the reversed action to that just described takes place should the glass temperature sensed by the pyrometer 84 drop below a preselected value. In this latter mentioned case the pyrometer 84 will send a measured variable signal by way of temperature controller 88 to the proportional pneumatic controller 126 which signal is below the preselected set point pressure that is in the set point chamber of this controller. This will cause the controller 126 to alter the output signal being sent to the air motors 148, 150 and pressure switch 248 to effect a movement of the dampers toward a closed condition and a cutting out of the blower so that a greater amount of heat may be retained in the cooling system that is being introduced by the lit burners 72. This action will cause the temperature of the glass that is being sensed by pyrometer 84 to increase and the measured variable then being sent to the controller 126 by way of conduit 122 to likewise increase. Through the use of this control arrangement the measured variable will thus be permitted to be rapidly raised to the desired set point level of the set point pressure that is within the set point chamber of the controller 126.

Should at any time thereafter the temperature of the cooling section slightly exceed the preselected desired value and the measured variable signal is increased the controller 126 will transmit an output pressure signal to the damper motors which will cause the damper bricks 234, 236, 238 to be lifted slightly so as to permit a small amount of cooling effect to take place above the molten glass 16 in the channel 78. Therefore such a control action will thus provide a way of simultaneously opening the butterfly valve and damper bricks slightly so that the full force of air then being blown by the air blower 252 and 254 into the cooling section 12 will not be introduced.

Since this control action allows only a small amount of cooling wind from the blower 254 to enter the cooling section of the forehearth, only a small quantity of heated air in the forehearth will be forced by this cooling wind, air flow, through the small opening then present in the damper blocks 234, 236, 238. Hence the blower and damper control presented herein provides an economical way of reducing the temperature of the open hearth slightly without an undesired excessive loss of the heat retained within the forehearth while the aforementioned slight temperature reduction control action takes place.

It can thus be seen from the aforementioned description that the automatic control apparatus which is disclosed in the specification provides a way of regulating the proper amount of cooling air that is simultaneously permitted to be blown into and exhausted from a cooling section of a forehearth so as to not only afford economic use of this air and the fuel being supplied to the burners of this section but also to enable a glass ware forming machine which receives molten glass gobs from this forehearth to produce a more desired uniform thickness and weight of glass ware.

What is claimed is:

1. An improvement in apparatus to automatically control the simultaneous heating and cooling of molten glass as it flows from a melting tank through a channel of a cooling section to a conditioning section of a forehearth, wherein a temperature controller having a means for continuously sensing the temperature of molten glass is employed to produce a first output control signal proportional to the temperature being sensed by the temperature sensing means and wherein a valve means is operatively connected to respond to changes in the magnitude of the control signal to regulate the mass flow rate of a fuel-gas-air mixture being transmitted to a burner located in said cooling section, said improvement residing in employing a second controller that is responsive to changes in the magnitude of the first control signal to produce a second output control signal which varies in accordance with the difference in magnitude of said first control signal and the magnitude of an adjustably fixed set point signal, a cooling wind blowing unit operably connected to respond to changes occurring in the magnitude of said second control signal to force cooling wind into said cooling section during a first condition in which the magnitude of said first control signal exceeds substantially that of the set point signal, a louver, a louver positioning means operably responsive to changes in the magnitude of the second control signal to allow substantially all of the cooling wind to be transmitted from said controlling wind blowing unit into said cooling section of said forehearth during said first-mentioned condition, a linkage connected at one end for movement with said louver positioning means and connected at another end to an adjustable damper block forming a removable wall of said cooling section, said last-mentioned linkage being operable to move the damper block toward a fully open hot air exhausting position during said first-mentioned condition and said louver actuating linkage and damper block positioning means being further operatively responsive to said second control signal under a second condition in which said first control signal is reduced by the control action of the second controller toward said set point level to effect a movement of said damper block and louver toward a closed position to thereby limit the amount of heated air in said cooling section that is exhausted therefrom while a simultaneous reduction in the amount of cooling wind from said blowing unit that is being forced into said cooling section takes place.

2. The control apparatus as specified in claim 1 wherein the second controller is of a pneumatic three mode type having adjustable needle valve settings that are adjusted to provide a very wide proportional band and very slow reset control action.

3. The improvement in control apparatus as defined in claim 1 wherein said louver actuating linkage and damper block positioning means are further operably responsive to be moved to a substantially closed position and the blowing unit disconnected when said second control signal reaches a third condition in which the magnitude of said first control signal has been reduced by the control action of the second controller to a magnitude that is equal to that of the set point.

4. An improvement in apparatus to automatically control the simultaneous heating and cooling of molten glass as it flows from a melting tank through a channel of a cooling section to a conditioning section of a forehearth, wherein a temperature controller having a means for continuously sensing the temperature of molten glass is employed to produce a first output control signal proportional to the temperature being sensed by the temperature sensing means and wherein a valve means is operatively connected to respond to changes in the magnitude of the control signal to regulate the mass flow rate of a fuel-gas-air mixture being transmitted to burners located in said cooling section, said improvement residing in employing a second controller that is responsive to changes in the magnitude of the first control signal to produce a second output control signal which varies in accordance with the difference in magnitude of said first control signal and the magnitude of an adjustably fixed set point signal, a cooling wind blowing unit operably connected to respond to changes occurring in the magnitude of said second control signal to force cooling wind into different portions of said cooling section during a first condition in which the magnitude of said first control signal exceeds substantially that of the set point signal, a plurality of louvers, louver positioning means operably responsive to changes in the magnitude of the second control signal to allow substantially all of the cooling wind to be transmitted from said controlling wind blowing unit into said different parts of the cooling section of said forehearth during said first-mentioned condition, a linkage connected at one end for movement with said louver positioning means and connected at another end to adjustable damper blocks forming removable wall portions of said cooling section, said last-mentioned linkage being operable to move the damper blocks toward a fully open hot air exhausting position during said first-mentioned condition and said louver actuating linkage and damper block positioning means being further operatively responsive to said second control signal under a second condition in which said first control signal is reduced by the control action of the second controller toward said set point level to effect a movement of said damper blocks and louvers toward a closed position to thereby limit the amount of heated air in said cooling section that is exhausted therefrom while a simultaneous reduction in the amount of cooling wind from said blowing unit that is being forced into said different parts of said cooling section takes place.

5. An improvement in control apparatus for making optimum use of the flow of cooling wind and the flow of a burner fuel-air mixture being fed into a cooling section of a forehearth to obtain a rapid reduction of the temperature of a molten material passing through said cooling section as it flows from a melting tank to a conditioning section of said forehearth, comprising the combination of means for measuring the temperature of the molten material, a temperature controller operably connected to said temperature measuring means to generate a first output control signal of a magnitude that is proportional to changes occurring in said measured temperature, an air-fuel regulating means controlled in accordance with changes occurring in the first signal to increase or decrease the mass flow rate of an air-fuel mixture that is being fed into burners of said cooling section, as said measured temperature is respectively decreased, said improvement comprising a second controller operably connected with the temperature controller to generate a second output control signal that is varied in accordance with the difference existing between a set point pressure applied thereto and the first control signal, a pressure switch controlled by the magnitude of said second output control signal to electrically cut in an air blower to send a flow of cooling wind through ducts to the interior of said forehearth whenever the magnitude of said first signal is raised above the level of said set point pressure by a predetermined amount and to electrically cut out said blower and said controlling wind flow whenever the magnitude of said first signal is lowered below the level of said set point pressure by a predetermined amount, an air-operated motor whose position is operably controlled by the magnitude of said second signal to move a butterfly valve positioned in said ducts and a damper brick in the top of said forehearth gradually toward an open position whenever said first signal exceeds the magnitude of said set point pressure or to move said butterfly valve and said brick toward a closed position whenever said first signal is lowered below the magnitude of said set point pressure.

References Cited in the file of this patent

UNITED STATES PATENTS

| | | |
|---|---|---|
| 1,916,983 | McKee | July 4, 1933 |
| 1,961,894 | Wadman | June 5, 1934 |
| 2,144,973 | Honiss | Jan. 24, 1939 |
| 2,401,861 | Cunningham | June 11, 1946 |
| 2,512,561 | Ziegler | June 20, 1950 |
| 2,567,892 | Osterman | Sept. 11, 1951 |

FOREIGN PATENTS

| | | |
|---|---|---|
| 442,175 | Great Britain | Feb. 4, 1936 |